United States Patent [19]

Sauvage et al.

[11] 4,297,324

[45] Oct. 27, 1981

[54] APPARATUS FOR THE CONTINUOUS PROCESSING OF COMPOUNDS IN A LIQUID

[75] Inventors: Henri Sauvage; Maurice Tarnero, both of Bagnols sur Ceze, France

[73] Assignee: Commissariat a l'Energie Atomique, Paris, France

[21] Appl. No.: 209,601

[22] Filed: Nov. 24, 1980

[30] Foreign Application Priority Data

Dec. 18, 1979 [FR] France .............................. 79 30951

[51] Int. Cl.³ .............................................. B01D 11/02
[52] U.S. Cl. ..................................... 422/268; 198/493; 198/750; 198/778; 209/158; 210/178; 366/227; 422/257; 422/260; 376/308
[58] Field of Search .................... 422/257, 260, 268; 406/92, 86; 198/493, 750, 778; 210/178, 210; 176/37; 366/227, 228; 209/158, 169; 261/81, 82

[56] References Cited

U.S. PATENT DOCUMENTS

| | | | |
|---|---|---|---|
| 2,283,457 | 5/1942 | Pecker | 210/210 X |
| 2,764,474 | 9/1956 | Glinka | 422/268 |
| 3,486,740 | 12/1969 | Christian | 366/227 |
| 3,595,375 | 7/1971 | Kaufman, Jr. et al. | 198/778 X |
| 3,709,665 | 1/1973 | Coulson | 422/257 |
| 3,805,949 | 4/1974 | Engdahl et al. | 198/778 |
| 3,921,794 | 11/1975 | Casselbrant | 366/227 X |

FOREIGN PATENT DOCUMENTS

| | | | |
|---|---|---|---|
| 885832 | 11/1971 | Canada | 198/778 |
| 597389 | 3/1978 | U.S.S.R. | 422/260 |

Primary Examiner—Richard L. Chiesa

[57] ABSTRACT

Apparatus for processing compounds in a liquid, wherein it is constituted by a helical vibrating elevator having a tank with a vertical axis, a fixed cover, an annular helical ramp fixed to the tank wall, means for imparting a reciprocating movement about its axis and in a vertical plane to the ramp, said movement being such that the rotation speed of the ramp in one direction exceeds the rotation speed thereof in the opposite direction, at least one liquid supply pipe in the cover, at least one lateral discharge opening for the liquid in the tank, a supply chute for the compounds carried by the cover and whose axis coincides with that of the tank and a discharge chute for the compounds located at the top of the helical ramp and in an extension of the latter.

The apparatus can in particular be used for the continuous dissolving of nuclear fuels in nitric acid during the reprocessing of said fuels.

10 Claims, 2 Drawing Figures

APPARATUS FOR THE CONTINUOUS PROCESSING OF COMPOUNDS IN A LIQUID

BACKGROUND OF THE INVENTION

The present invention relates to an apparatus for continuously processing compounds in a liquid, which is more particularly to be used for the continuous dissolving of nuclear fuels in nitric acid during the reprocessing of said fuels.

A certain number of apparatuses are already known for the continuous dissolving of nuclear fuels in order to separate them from their cans and after cutting up the fuel assemblies to be processed can fragments are obtained.

Certain of these apparatus are constituted by vibrating hoist conveyors having a vertical shaft carrying a helical ramp on which the can fragments are transferred form a low position to a high position under the action of the vibrations imparted to the ramp by the vertical shaft. These vibrations correspond to a helical reciprocating movement and make it possible to ensure the upward displacement of the can fragments.

Due to the vertical component of the movement imparted to the helical ramp in this way, these known apparatus must be mounted on elastic blocks or springs making them both complex and fragile. Moreover, mechanical stresses are produced by the resistance of the liquid to the vertical component of the reciprocating movement imparted to the ramp and must be withstood by the ramp. This leads to fatigue to the welds and may bring about mechanical failures.

BRIEF SUMMARY OF THE INVENTION

The present invention relates to an apparatus for processing compounds in a liquid and which does not have the disadvantages of the prior art apparatus.

The present invention therefore relates to an apparatus for processing compounds in a liquid, wherein it is constituted by a helical vibrating elevator having a vertically axed cylindrical tank, a fixed cover, an annular helical ramp fixed to the tank wall, means for imparting a reciprocating movement about its axis and in a vertical plane to the ramp, said movement being such that the rotation speed of the ramp in one direction exceeds the rotation speed thereof in the opposite direction, at least one liquid supply pipe in the cover, at least one lateral discharge opening for the liquid in the tank, a supply chute for the compounds carried by the cover and whose axis coincides with that of the tank and a discharge chute for the compounds located at the top of the helical ramp and in an extension of the latter.

According to the invention, the vibrations transmitted to the helical ramp are formed by a reciprocating movement having no vertical component. This feature makes it possible to eliminate the elastic blocks or springs necessary for support purposes in the known apparatus, whilst significantly reducing the risks of mechanical failure.

According to a first variant of the invention, the rotation speed of the ramp in the upward direction exceeds the rotation speed of the ramp in the opposite direction.

According to a second variant of the invention, the rotation speed of the ramp in the downward direction exceeds the rotation speed of the ramp in the opposite direction.

According to another feature of the invention, the frequency of the reciprocating movement of the ramp is between 5 and 60 mn$^{-1}$. This relatively low frequency again makes it possible to reduce the mechanical stresses to which are exposed the mechanical parts of the apparatus, which further reduces fatigue to the welds.

According to a secondary feature of the invention, the means for imparting a reciprocating movement to the ramp comprise at least one jack positioned between the ramp and a fixed frame.

Preferably, the bottom of the tank defines a portion inclined towards the entrance to the helical ramp making it possible for the materials or objects introduced by the feed chute to position themselves at the bottom of the helical ramp.

According to yet another feature of the invention, at least one of the liquid supply pipes issues onto a submerged turn of the helical ramp, so as to continuously rinse the remaining compounds prior to their removal by the discharge chute.

According to another feature of the invention, when such an apparatus is used for the reprocessing of nuclear fuels, the cover has an annular core made from a neutrophagous material positioned between the supply chute and the helical ramp.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
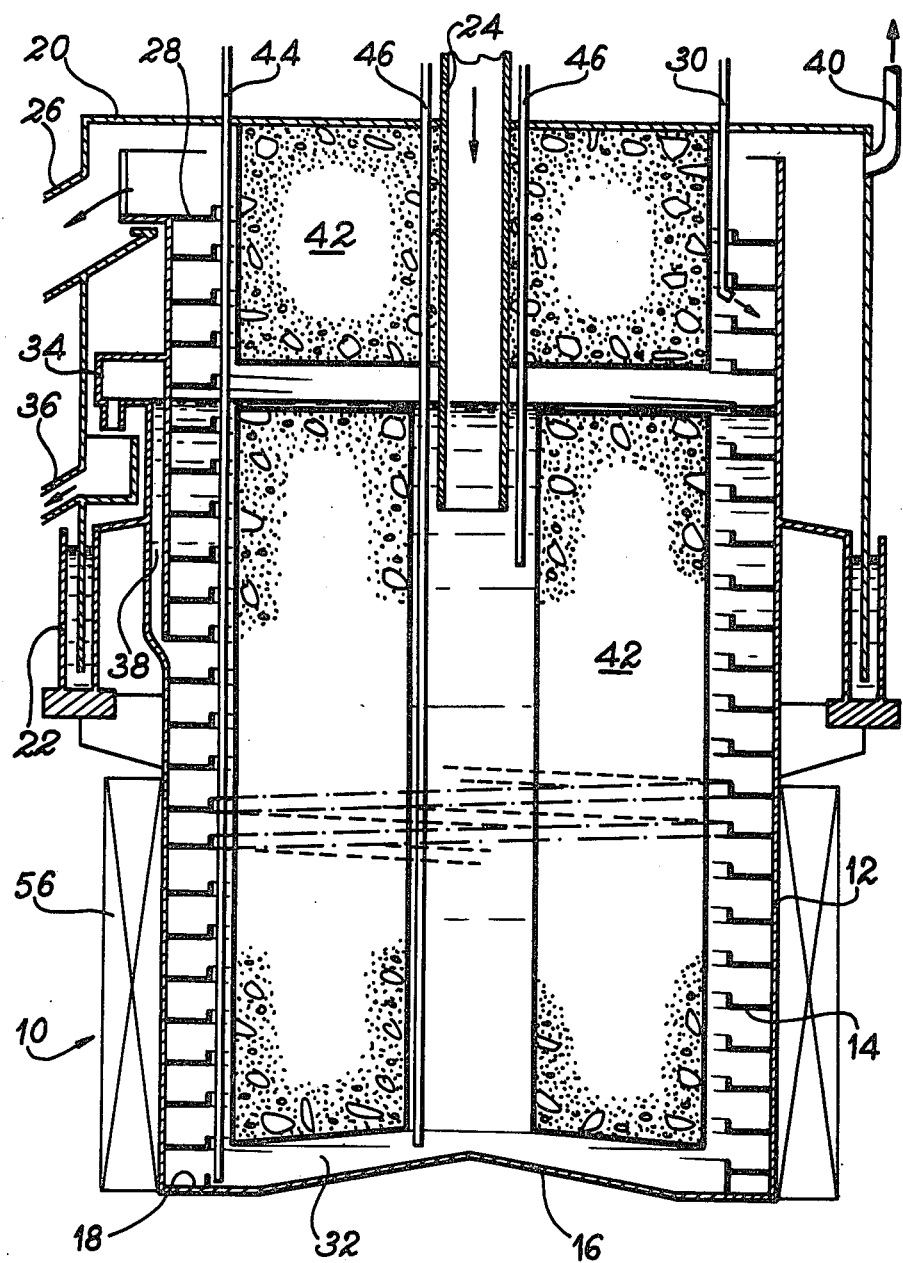
FIG. 1 a vertical sectional view showing an apparatus particularly suitable for the reprocessing of nuclear fuels and intended for dissolving these fuels in nitric acid.

The apparatus for dissolving compounds such as nuclear fuels in a liquid such as nitric acid shown in FIG. 1 comprises a helical vibrating elevator 10. Elevator 10 has a cylindrical tank 12, whose wall carries an annular helical ramp 14 and whose bottom 16 is conical so as to define a portion inclined towards the entrance of ramp 4 constituting its lower end 18.

Elevator 10 also has a fixed cover 20, whose sealing with tank 12 is ensured by a hydraulic guard 22. In the centre of cover 20, there is a supply chute 24 for the material to be dissolved and its axis coincides with that of tank 12. The compounds left behind at the end of the dissolving operation are removed by a discharge chute 26 formed in cover 20 forcing the upper end 28 of helical ramp 14.

Cover 20 also carries a supply pipe 30 for the dissolving liquid, formed by nitric acid when the compounds introduced by chute 24 are nuclear fuels. Preferably and in order to continuously rinse or wash these compounds before they are removed by chute 26, the free end of supply pipe 30 issues onto a submerged turn or coil of the helical ramp 14 in the manner shown in FIG. 1.

The discharge of the solution 32 formed by the mechanical action of the nitric acid arriving through pipe 30 on the compounds such as irradiated nuclear fuels arriving by chute 24, is brought about by means of an overflow system 34 formed in the wall of tank 12 and which issues into a lateral discharge opening 36 formed in cover 20. In a not shown constructional variant, the overflow 34 is connected to the discharge opening by a flexible tube. Preferably and due to the movements imparted to tank 12, the overflow 34 is separated by the latter by tranquilizing means 38.

A pipe 40 is also provided in cover 20 for discharging dissolving gases formed in tank 12.

For reasons of safety and criticality, when the apparatus of FIG. 1 is intended for the reprocessing of nuclear fuels and particularly when these fuels come from a breeder reactor, cover 20 has an annular core 42 made from a neutrophagous material such as boron-containing concrete sheathed with stainless steel positioned between the supply chute 24 and the helical ramp 14. As illustrated in FIG. 1, core 42 defines with helical ramp 14 an annular space and, in the extension of chute 24, a cylindrical inner space. These spaces more particularly permit the passage of the dissolving liquid supply pipe 30, as well as other pipes such as the drain pipe 44 and miscellaneous control and inspection pipes 46 fixed to the cover at 20 and arranged in ring-like manner in the spaces described hereinbefore. The control and inspection pipes 46 may be in the form of bubble rods for measuring the level, density, temperature, etc.

Figure 2:
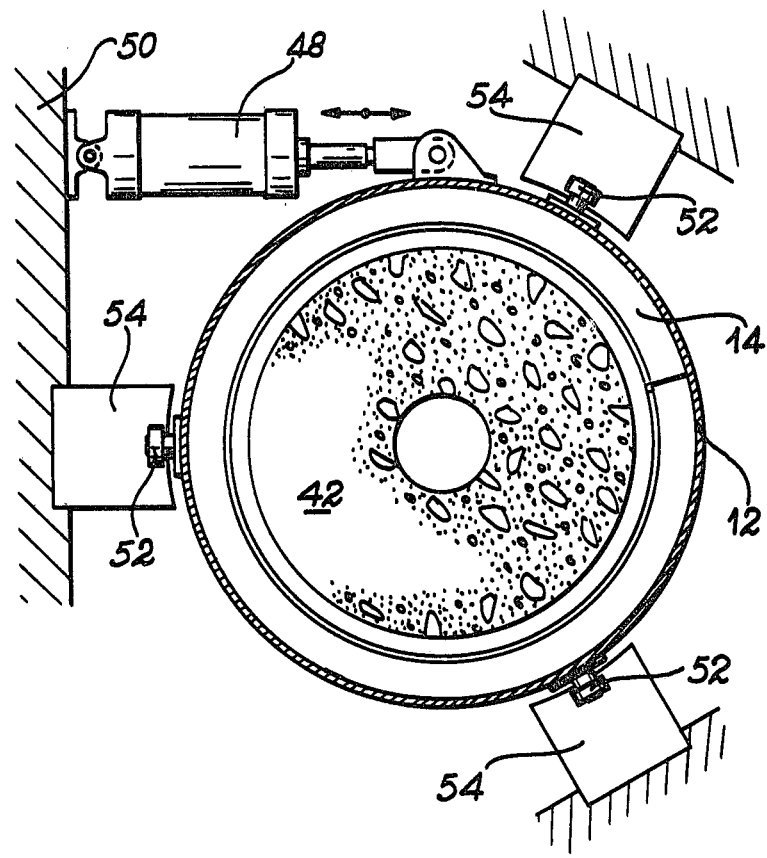
FIG. 2 a part sectional plant view of the apparatus of FIG. 1 more particularly illustrating the double acting jack by means of which a reciprocating movement about its axis is so transmitted to the helical ramp of the apparatus.

As is more particularly illustrated in FIG. 2, means are provided for giving tank 12 and consequently ramp 14 a reciprocating movement about their common axis and in a horizontal plane. This movement is in the form of a rapid advance in the upward direction of the compounds introduced by chute 24 onto ramp 14 and a slow return in the opposite direction or a slow advance in the upward direction followed by a rapid return in the opposite direction. Both these types of movement have the effect of raising the compounds on the ramp when the forward and return speed ratios are appropriately selected. In the represented embodiment, this reciprocating movement is imparted to the tank by a double acting jack 48, whose body is articulated on a fixed frame 50 and whose rod is articulated on the wall of tank 12. Thus, jack 48 controls the forward and return movements of the compounds, the forward speed thereof exceeding the return speed or vice versa as a result of the pressure difference between the compressed air in the two chambers of the jack and/or by controlling the pressure drop at the engine air exhausts.

According to another not shown embodiment, the means for imparting a reciprocating movement to tank 12 and ramp 14 can comprise two single acting jacks acting at two diametrically opposite points of the tank wall, one of the jacks controlling the tank movement in the upward direction of the compounds along ramp 14, whilst the other jack controls the jack movement in the opposite direction.

The reciprocating movement of the tank could also be controlled by an appropriate mechanism, such as a cam system.

Preferably, the vibrations imparted to the tank 12 and helical ramp 14 by jack 48 in the represented embodiment are of low frequency, so as to reduce to a maximum fatigue to the mechanical parts of the apparatus, thus preventing any risk of unexpected failure of the welds. Thus, the frequency of the reciprocating movement of the ramp is in principle between 5 and 60 nm$^{-1}$.

In view of the fact that the vibratory movement imparted to tank 12 and ramp 14 is limited to a reciprocating movement in a horizontal plane, the support of tank 12 can be in a particularly simple manner and without using flexible members such as elastic blocks or springs. Thus, in the embodiment shown in the drawings, this support is provided by means of three rollers 52 rolling on planar surfaces 54 positioned in the same horizontal plane and formed on members integral with frame 50.

When the liquid 32 in tank 12 is used for dissolving nuclear fuels, it is formed by nitric acid which must be heated by heating means 56 arranged outside tank 12 between the bottom of the latter and the hydraulic guard 22 in the represented embodiment. The nitric acid can then be heated, for example, by induction or by means of radiant panels. In another not show embodiment, the acid can be heated by means of a double jacket arranged around the central core.

In certain cases and in particular when it is necessary to drain off tank 12, the nitric acid contained therein must be cooled. This cooling can be obtained by circulating a cooling liquid between two jackets positioned around the central core.

The apparatus for dissolving compounds in a liquid described hereinbefore with reference to FIGS. 1 and 2 functions in the following manner.

During the reprocessing of nuclear fuels, the rods containing the fuel are firstly sheared in order to bear the fuel and then the thus obtained fragments are introduced into a dissolving apparatus like that described hereinbefore which contains a nitric acid bath heated to boiling point. The dissolving operation carried out in this apparatus is intended to separate the solution containing nuclear fuel such as uranium and plutonium from solid waste which in particular contains can fragments.

As tank 12 is filled with nitric acid 32 by supply pipe 30 until its level is flush with overflow 34 and the acid is heated to boiling by heating means 56. The can fragments containing the nuclear fuel are then introduced either continuously or discontinuously by the supply chute 24 and drop onto the conical bottom 16 of tank 12 so as to be brought to the lower end 18 of helical ramp 14. By jack 48 and via tank 12, ramp 14 is exposed to a reciprocating movement about its axis and in a horizontal plane under the action of a double acting jack 48 in such a way that the tank rotation speed in the direction corresponding to the rise of the fragments along the ramp exceed s the tank rotation speed in the opposite direction or vice versa. In both cases, the can fragments slowly rise along ramp 14. During this displacement, the reaction of dissolving the nuclear fuel by the nitric acid heated to boiling point leads to a solution of this fuel being obtained in nitric acid which is removed by the overflow 34 and the discharge opening 36, as indicated by the arrow in FIG. 1. Simultaneously, the dissolving vapours produced are discharged by part 40.

When the solid waste emerges from the nitric acid solution 32 as a result of its rise along ramp 14, the vibrations which continue to be imparted to the fragments contribute to the removal of all liquid retained by them and they are then continuously rinsed by fresh acid which is supplied by pipe 30 before being discharged at the upper end 28 of ramp 14 in chute 26.

In the case of the special and non-limitative application of the invention described hereinbefore it is pointed out that, besides the advantages refered to hereinbefore, the apparatus has no perforation liable to cause a jamming or wedging of small particles which could be prejudicial to the discharge of the can fragments. Moreover, said apparatus is particularly simple and robust and makes it possible to process solids of very varied size and shape, because a ramp of useful width 90 mm can without difficulty, receive can fragments of length 30 mm. In addition, the special construction of the tank and the arrangement of the pipes on the cover permit easy dismantling of the tank, so that the latter can easily be inspected and replaced.

The invention is obviously not limited to the embodiments described in exemplified manner hereinbefore and in fact covers all variants thereof without passing beyond the scope of the invention.

What is claimed is:

1. An apparatus for processing compounds in a liquid, wherein it is constituted by a helical vibrating elevator having a cylindrical tank with a vertical axis, a fixed cover, an annular helical ramp fixed to the tank wall, means for imparting a reciprocating movement about its axis and in a vertical plane to the ramp, said movement being such that the rotation speed of the ramp in one direction exceeds the rotation speed thereof in the opposite direction, at least one liquid supply pipe in the cover, at least one lateral discharge opening for the liquid in the tank, a supply chute for supplying the compounds carried by the cover and whose axis coincides with that of the tank and a discharge chute for discharging the compounds located at the top of the helical ramp and in an extension of the latter.

2. An apparatus according to claim 1, wherein the ramp rotation speed in the upward direction exceeds the ramp rotation speed in the opposite direction.

3. An apparatus according to claim 1, wherein the ramp rotation speed in the downward direction exceeds the ramp direction rotation speed in the opposite direction.

4. An apparatus according to claim 1, wherein the frequency of the reciprocating movement of the ramp is between 5 and 60 mn $^{-1}$.

5. An apparatus according to claim 1, wherein the means for imparting a reciprocating movement to the ramp comprise at least one jack arranged between the ramp and a fixed frame.

6. An apparatus according to claim 1, wherein the bottom of the tank defines a portion inclined towards the entrance of the helical ramp.

7. An apparatus according to claim 1, wherein the liquid supply pipe issues onto a submerged turn or coil of the helical ramp so as to continuously rinse the residual compounds prior to their removal by the discharge chute.

8. An apparatus according to claim 1, wherein the lateral liquid discharge opening is separated from the tank by tranquilizing means.

9. An apparatus according to claim 1, wherein the lateral liquid discharge opening issues into a liquid discharge chute carried by the cover.

10. An apparatus according to claim 1 intended for the reprocessing of nuclear fuels, wherein the cover has an annular core made from a neutrophagous material positioned between the supply chute and the helical ramp.

* * * * *